United States Patent

Tanaka

[11] Patent Number: 5,511,636
[45] Date of Patent: Apr. 30, 1996

[54] DRUM BRAKE DEVICE TO FACILITATE VISUAL CONFIRMATION OF WEAR

[75] Inventor: Takao Tanaka, Nagoya, Japan

[73] Assignee: Nisshinbo Industries, Inc., Tokyo, Japan

[21] Appl. No.: 426,607

[22] Filed: Apr. 21, 1995

[30] Foreign Application Priority Data

Apr. 26, 1994 [JP] Japan .................. 6-110561

[51] Int. Cl.$^6$ .................. F16D 66/00; F16D 65/10
[52] U.S. Cl. .................. 188/1.11; 188/325
[58] Field of Search .................. 188/78, 250 A, 188/250 B, 250 R, 250 G, 325

[56] References Cited

U.S. PATENT DOCUMENTS

| | | | |
|---|---|---|---|
| 3,138,224 | 6/1964 | White | 188/78 |
| 3,782,513 | 1/1974 | Birge | 188/1.11 W |

FOREIGN PATENT DOCUMENTS

| | | |
|---|---|---|
| 1586200 | 3/1981 | European Pat. Off. . |
| 0429110A1 | 5/1991 | European Pat. Off. . |
| 0519340A1 | 12/1992 | European Pat. Off. . |
| 3027578 | 2/1982 | Germany . |
| 49-29346 | 1/1974 | Japan . |

*Primary Examiner*—Robert J. Oberleitner
*Assistant Examiner*—Chris Schwartz
*Attorney, Agent, or Firm*—Nikaido Marmelstein Murray & Oram

[57] ABSTRACT

The objective of the claimed invention is to provide a drum brake device that enables an accurate determination of the degree of wear in the brake lining with an external visual examination. A colored strip 24, that visually confirms the amount of wear in the brake lining, is formed on one side face 23a of the brake lining 23 contained in brake shoe 20, and code 25 is superimposed on said colored strip. An inspection hole 14, bored in backplate 10 in a position facing the colored strip 24 and code 25 formed on lining 23, is used to visually ascertain the amount of wear in lining 23 and to check for the assembly of foreign parts in the brake shoe 20.

6 Claims, 4 Drawing Sheets

DRUM BRAKE DEVICE TO FACILITATE VISUAL CONFIRMATION OF WEAR

BACKGROUND OF THE INVENTION

The present claimed invention relates to a drum brake device that facilitates an external visual confirmation of the degree of wear in the brake linings, and of a code that indicates the quality and other features of the brake shoe, without having to dismantle related parts or the device as a whole.

The decision to install new brake shoes because of excessive wear in the linings is generally based on the distance traveled and the age of the old shoes. The amount of wear will vary with the conditions of use and other factors and thus these criteria are not dispositive.

Methods known to accurately determine the amount of wear include the dismantling of the brake drum for a direct examination of the lining, or to mold a continuous shoulder on both side faces of the lining to indicate the threshold wear limit, or to mold a colored strip for use as a marker from which to ascertain the state of wear (publication of Japanese Patent Utility Model No. 1974-29346).

Brake shoes are also coded to identify the manufacturer, material, guarantee, type, or other codes (hereafter collectively referred to as code) to prevent the assembly of foreign-parts, for advertising purposes, to satisfy legal requirements, or other reasons.

OBJECTIVE OF THE PRESENT CLAIMED INVENTION

The objective of the present claimed invention is to provide a drum brake device that facilitates an external visual confirmation of the degree of wear in the brake linings, and of a code marked on the brake shoe.

Conventional brake shoe devices have various problems as follows:

1. The brake drum must be dismantled to determine the amount of wear in the lining or to read the code marked on the brake shoes, and this dismantling and re-assembly is cumbersome;
2. The molding of a shoulder on the narrow side face of the lining makes it difficult to stamp the code, necessitating that the code be marked somewhere other than on a side face;
3. An external visual confirmation of a code marked as described in Point 2 necessitates the drilling of another hole separate from the normal hole for inspection of brake lining wear; and
4. A line or colored strip on the side face of the lining to indicate the threshold wear limit will not function as the code described previously. This necessitates separate markings for each function, again requiring time and labors.

The present claimed invention is specifically designed to solve these problems.

The present claimed invention is a device for a drum brake that brakes a vehicle by applying pressure to a brake drum that rotates around the brake shoes positioned so as to contract and expand on a backplate. The device comprises, at least one colored strip, located on one or both side faces of the brake lining, that visually confirms the amount of wear in the brake lining, and a code superimposed on the colored strip, that indicates the type of material or other characteristics of the brake lining.

This device is also characterized in that the colored strip is on the most abraded portion of the lining, or is of a depth equivalent to the operative abraded area of the lining.

This device is further characterized by an inspection hole bored in the backplate covering the side face of the brake shoe or in the brake drum, in a location facing the colored strip formed on the lining is provided.

This device has the following advantages:

1. Both the amount of lining wear and code marked on the brake shoe can be accurately determined by an external visual examination from an inspection hole. This enables an accurate determination of when to replace the brake shoe, and facilitates a check of the assembly or the proper parts;
2. No shoulder is formed on the side face of the lining, which makes it easier to form colored strips with codes;
3. Both the colored strip to visually ascertain the amount of lining wear and the brake shoe code can be efficiently produced in one operation;
4. The drum brake device is a general-purpose device applicable to different types of brake shoes or different types of brakes in which the threshold wear limit of the lining varies;
5. Colored strips and codes can be coordinated with existing inspection holes, which eliminates the need to bore a separate inspection hole; and
6. Several colored strips and codes can be formed along the center of the lining. This enables the lining to be bonded to the brake shoe in any direction to facilitate fabrication of the brake.

An inspection hole bored in the backplate is used to visually examine the colored strip, and code thereof, marked on the interior lining of the brake, wherein the colored strip ascertains the amount of wear in the lining, and the code checks the quality, type, and other features of the brake lining.

The colored strip is consumed along with wear of the lining, and the amount of colored strip that remains is used to determine the state of the lining. When the lining reaches its threshold wear limit, the colored strip is no longer visible, and the brake shoe should be replaced.

After the brake shoe is replaced, the inspection hole is used to visually examine the code on the colored strip to easily check externally whether foreign parts have been assembled.

DETAILED DESCRIPTION OF THE FIGURES AND OF THE PREFERRED EMBODIMENT

The above and other objects and the attendant advantages of the present claimed invention will become readily apparent by reference to the following detailed description when considered in conjunction with the accompanying drawings wherein:

1. EXAMPLE I a. Drum Brake Device

Figure 3:
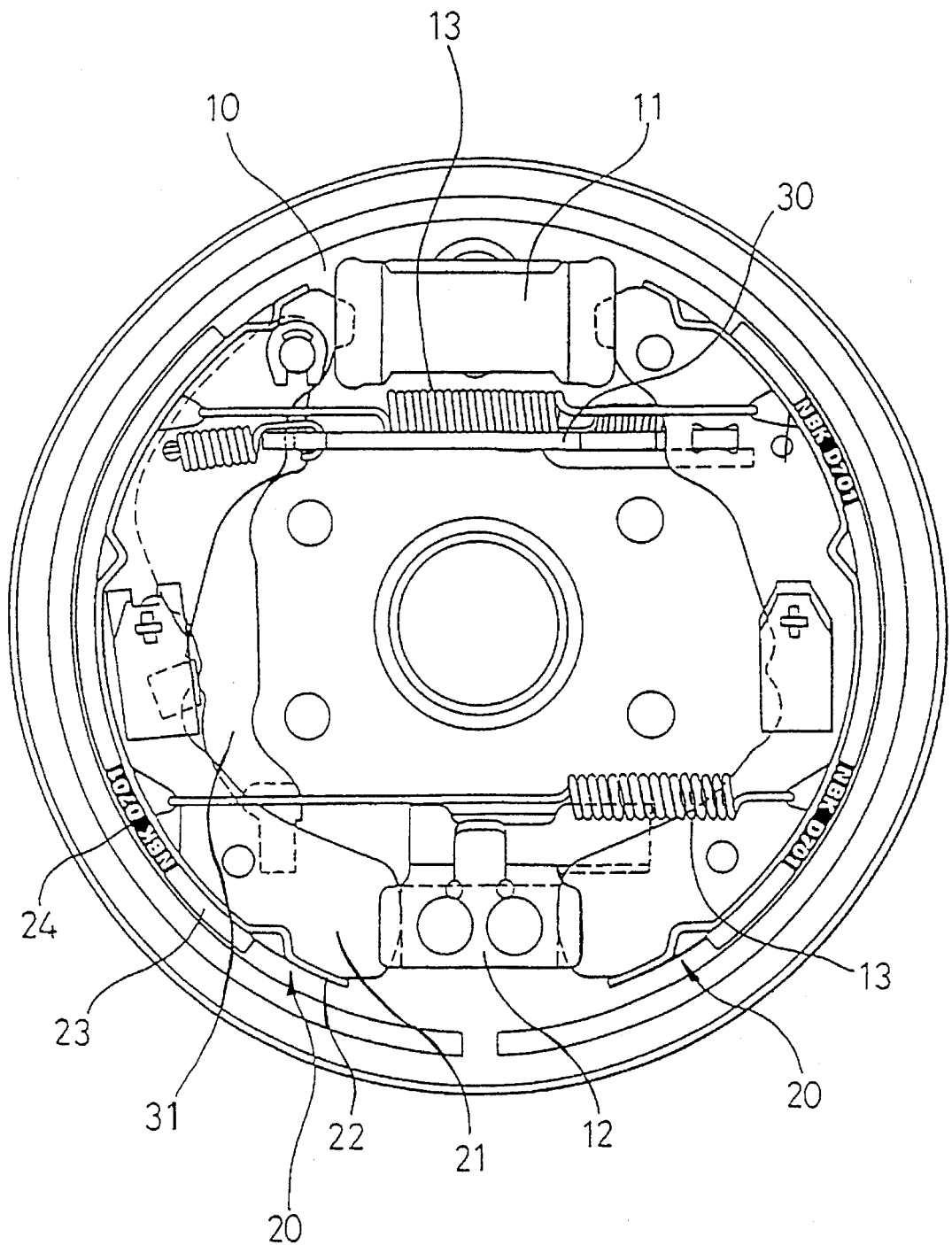
FIG. 3 is a planar diagram of a drum brake device.

FIG. 3 is a planar diagram of a leading-trailing type drum brake device, with the brake drum being omitted from the figure.

Backplate 10 is affixed to a non-rotating part of the vehicle. A pair of brake shoes 20, 20 are mounted on the backplate in such a manner so as to be capable of expanding or contracting. That is, one end of each brake shoe 20 abuts against the brake cylinder 11, and the other end of each shoe abuts against the anchor 12 set on the backplate. Return springs 13, 13 are tensioned between the two brake shoes 20, 20, wherein the brake shoes 20, 20 open and expand as the hydraulic brake cylinder 11 expands, or close and contract with the action of the return springs 13, 13.

On the brake cylinder 11 side, an automatic clearance adjustment mechanism 30 is set between the two brake shoes 20, 20, which automatically adjusts the clearance between the brake shoes and brake drum 32 as a function of the amount of wear in the lining 23. This mechanism 30 is not restricted to the strut type as shown in the figure, but can be of any publicly-disclosed configuration.

The drum brake device is also equipped with a mechanically-acting mechanism, comprised of a brake lever 31 pivoted to the brake shoe 20 shown on the left side of FIG. 3, wherein the counterclockwise rotation of the brake lever causes the pair of brakes shoes 20, 20 to open and expand. This mechanism is not restricted to the type as shown in the figures, and any publicly-disclosed mechanism can be used.

Each component of the drum brake device is explained in detail below.

b. Brake Shoe

Figure 4:
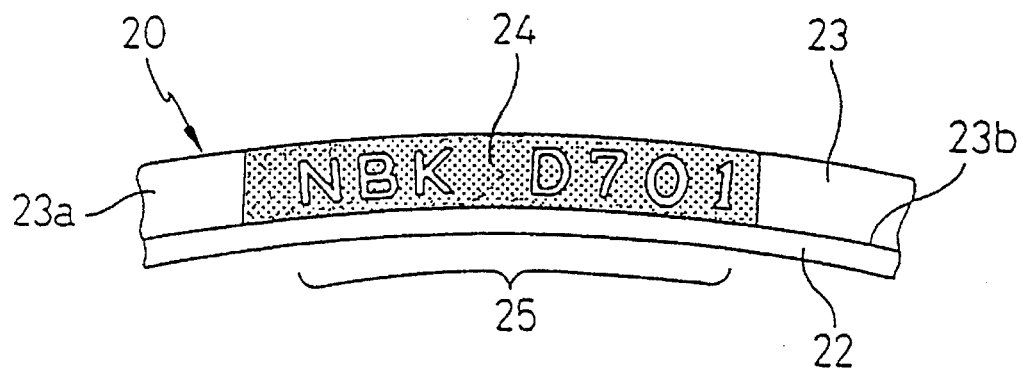
FIG. 4 is an expanded diagram of a portion of a brake shoe.

Each brake shoe 20 is formed from a shoe web 21 bonded to the inner circumference of an arc-shaped rim 22 in a cross section "T" configuration, and a lining 23 bonded on the external circumference thereof. At least one colored strip 24 is provided on one side face 23a of the lining 23, and code 25 is superimposed on the colored strip to form an integrated unit. As shown in FIG. 4, the colored strip 24 borders the threshold wear limit 23b which is equal to the thickness of the lining 23.

To mark the code 25 on the colored strip 24, the code 25 can be reverse printed such that it is displayed in the ground color of the lining 23 on the colored strip 24, or the code can be painted a different color than the colored strip 24.

Basically, the colored strip 24 should be a color that can be visually and positively differentiated from the lining 23 and code 25. Code 25 should be a color that can be visually and positively differentiated from the colored strip 24. Any publicly-disclosed fluorescent paint can be mixed with the paint for the colored strip 24 and code 25; this will enable them to be visually examined even in dark places.

A normal hot stamp method can be used as one means to form the colored strip 24 on the lining. For this, a pigment is mixed with a glue or other adhesive, and the mixture is applied in a thin film onto a polyethylene strip. This strip is laid colored-side down against the side face 23a, then pressed with a hot metal mold, wherein the color is transferred to the said side face.

In this case, code 25 can be applied simultaneously as follows:

1. For a reverse printing of the code, that portion of the metal press corresponding to the code is depressed, wherein upon pressing the mold, the color will be transferred only to those portions of the strip not containing the code; and
2. For a colored code, code 25 is applied in a different color by a second hot stamp pressing on top of the transferred colored strip 24.

The colored strip 24 can be displayed on one side face 23a or both side faces of lining 23. Also, since the most abraded portion of lining 23 will vary with the shape of the brake, it is essential that the colored strip 24 be positioned to correspond to the most abraded portion of a particular brake.

c. Visual Inspection Hole

Figure 1:
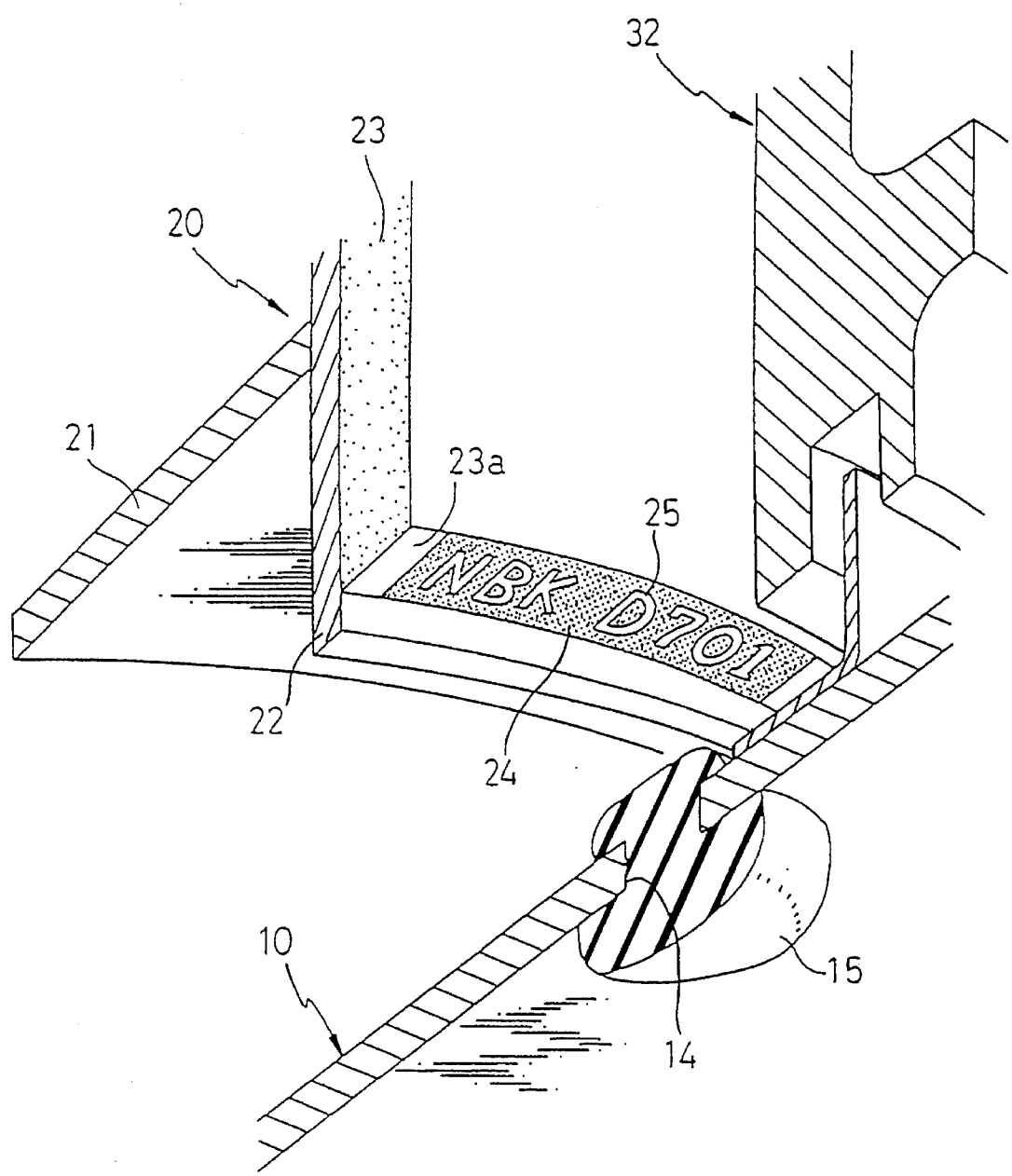
FIG. 1 is a perspective drawing of the drum brake device as embodied in Example 1, in which a portion of the device has been omitted.
Figure 2:
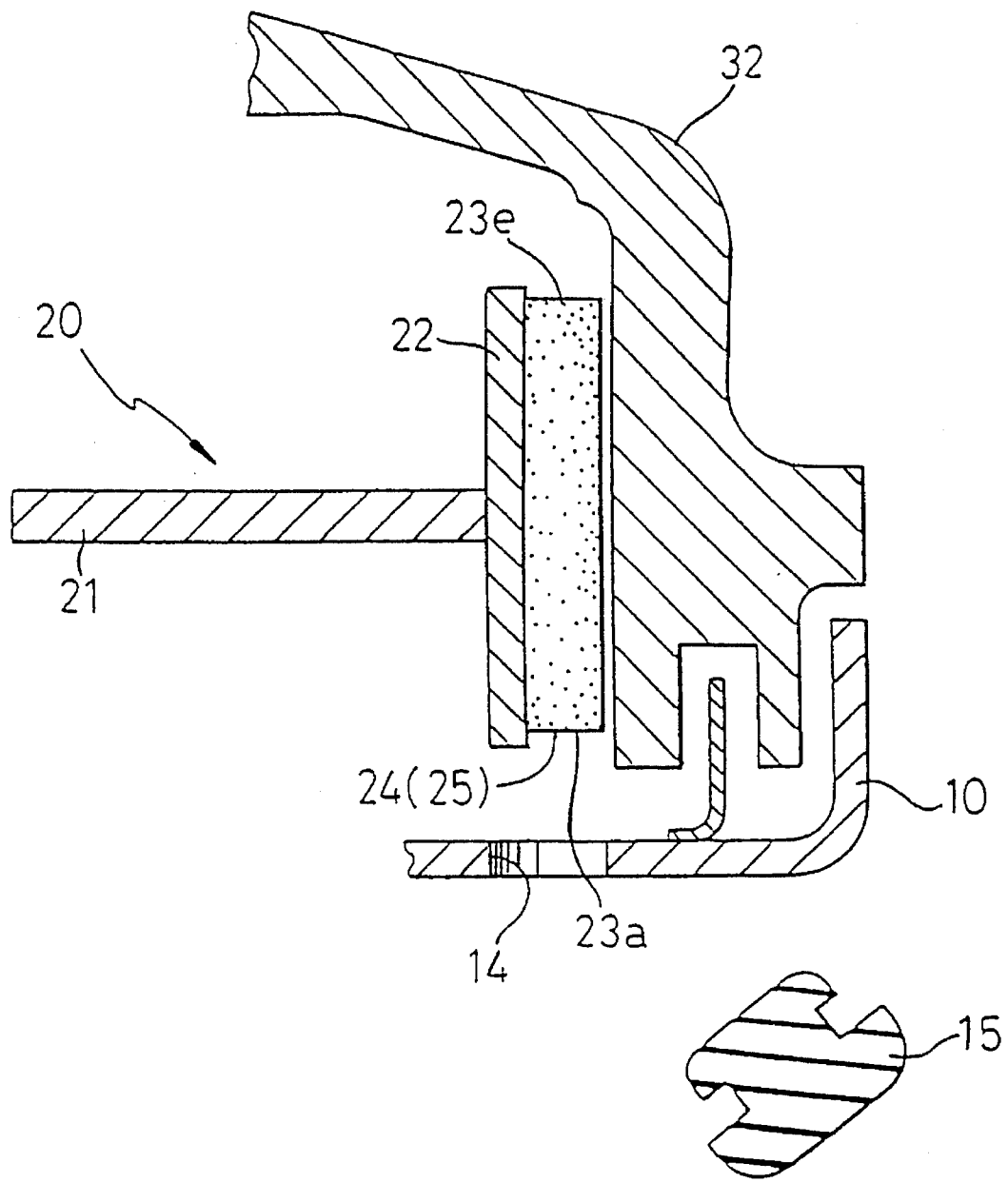
FIG. 2 is a cross section diagram of the peripheral edge of a drum brake device.

In the drum brake device of this invention, as shown in FIGS. 1 and 2, an inspection hole 14 is bored in the required position on backplate 10 corresponding to the most abraded portion of lining 23. This hole enables a visual inspection of the amount of wear in the lining. Since the colored strip 24 and code 25 are positioned to correspond to the most abraded portion, they can be visually confirmed through the existing inspection hole 14, and no additional hole need be bored.

This inspection hole 14 is covered by a grommet 15 to prevent water and dust penetration, which can be removed to visually examine the colored strip 24 and code 25.

The inspection hole 14 is not restricted to an existing hole, and a new hole can be bored on backplate 10 in a position facing the colored strip 24 and code 25.

2. EXAMPLE II

Figure 5:
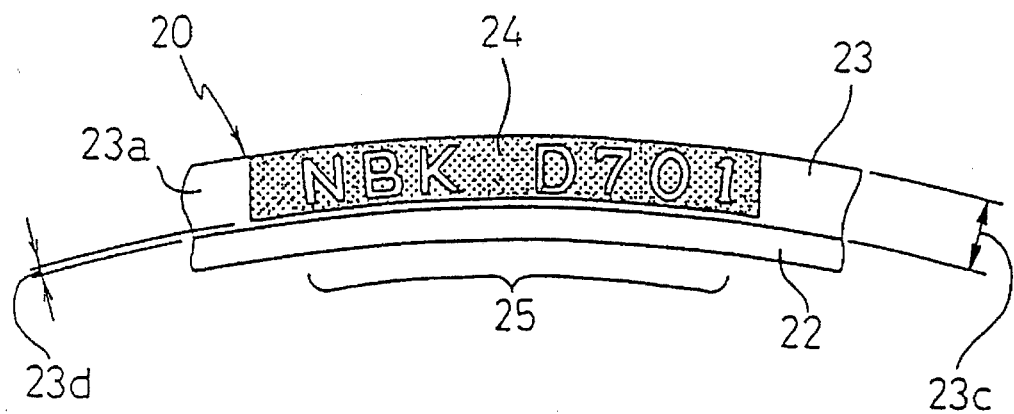
FIG. 5 is an expanded diagram of a portion of a brake shoe to explain another embodiment of this invention in which the colored strip is of a different depth.

FIG. 5 shows another embodiment of this invention in which the colored strip 24 covers a depth equivalent to the operative abraded area 23c. In this embodiment, a contingency margin 23d is left between the rim 22 and the inner edge of colored strip 24.

This contingency margin 23d is left to allow for a margin of safety in replacing the brake shoe, and to accommodate cases where items such as rivets or bolts used to affix the lining 23 to the rim 22, protrude from the surface of the said rim.

This embodiment differs from Example 1 only in the depth of the colored strip 24, and otherwise is identical to Example I as to configuration and effectiveness of usage.

3. EXAMPLE III

Example I explained the device of this invention for a leading-trailing type drum brake which combines hydraulic and mechanical action. This device is not restricted to this type of drum brake, and can be applied to a drum brake that applies a hydraulic, mechanical, or pneumatic action, or a combination thereof, or a two-leading type (2L), two-trailing type (2T), dual-two-leading type (D2L), duo-servo type (DS), uni-servo type (US), or other type of internally-expanding , externally-contracting, or band-type drum brake.

4. EXAMPLE IV

In the brake shoe 20 of Examples I–III inclusive, the section of the rim 22 that is parallel to the sliding face of brake drum 32 is welded to the section of the web 21 that is perpendicular to the sliding face of brake drum 32 to form a cross section "T", and lining 23 is bonded to the external circumference of rim 22. The brake shoe 20 is not restricted to this configuration, and can be of a type where the web and rim are bonded to form a cross section "L", a type where a rim is bonded to two side-by-side webs to form two "T's" in cross section, or a type where the rim and web are integrally molded.

5. EXAMPLE V

The inspection hole is not restricted to the backplate 10, but can be bored in the brake drum 32. In this case, the inspection hole is bored in a location facing the colored strip 24 and code 25 marked on the other side face 23e of lining 23.

6. EXAMPLE VI

As shown on the brake shoe 20 on the right side of FIG. 3, several colored strips 24 can be displayed on one side face 23a of lining 23. In this case, the colored strips 24 should be formed symmetrically to the center of the lining 23, which will eliminate the need for bonding the lining to the brake shoe 20 (rim 22) in a certain direction, thus facilitating the fabrication process.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

I claim:

1. A device for use with a drum brake which brakes a vehicle by applying a pressure to a brake drum that rotates around the brake shoes positioned to contract and expand on a backplate, said device comprising:

at least one colored strip, located on one or both side faces of a brake lining, that visually confirms the amount of wear in the brake lining; and a code, superimposed on the colored strip, that indicates the type of material or other characteristics of the brake lining.

2. A drum brake device as claimed in claim 1, wherein the colored strip is on a most abraded portion of the lining.

3. A drum brake device as claimed in claim 1 wherein the colored strip is of a depth equivalent to an operative abraded area of the lining.

4. A drum brake device as claimed in claim 1 further comprising:

an inspection hole bored in a member covering a side face of a brake shoe in a location facing the colored strip formed on the lining.

5. A drum brake device as claimed in claim 2 further comprising:

an inspection hole bored in a member covering a side face of a brake shoe in a location facing the colored strip formed on the lining.

6. A drum brake device as claimed in claim 3 further comprising:

an inspection hole bored in a member covering a side face of a brake shoe in a location facing the colored strip formed on the lining.

\* \* \* \* \*